US008605067B2

(12) United States Patent
Chen et al.

(10) Patent No.: US 8,605,067 B2
(45) Date of Patent: Dec. 10, 2013

(54) SOURCE-DRIVING CIRCUIT, DISPLAY APPARATUS AND OPERATION METHOD THEREOF

(75) Inventors: Jen-Chieh Chen, Hsin-Chu (TW); Chao-Ching Hsu, Hsin-Chu (TW); Ching-Lin Li, Hsin-Chu (TW)

(73) Assignee: Au Optronics Corp., Hsinchu (TW)

( * ) Notice: Subject to any disclaimer, the term of this patent is extended or adjusted under 35 U.S.C. 154(b) by 56 days.

(21) Appl. No.: 13/308,815

(22) Filed: Dec. 1, 2011

(65) Prior Publication Data

US 2012/0154358 A1 Jun. 21, 2012

(30) Foreign Application Priority Data

Dec. 17, 2010 (TW) .............................. 99144541 A

(51) Int. Cl.
*G06F 3/038* (2013.01)
*G09G 5/00* (2006.01)

(52) U.S. Cl.
USPC ............................................ 345/209; 349/48

(58) Field of Classification Search
USPC ........................... 345/87, 100, 204, 208, 214
See application file for complete search history.

(56) References Cited

U.S. PATENT DOCUMENTS

| | | | | |
|---|---|---|---|---|
| 6,549,186 | B1 | 4/2003 | Kwon | |
| 7,215,311 | B2 | 5/2007 | Kim | |
| 8,031,146 | B2 * | 10/2011 | Park et al. | 345/87 |
| 2007/0200815 | A1 | 8/2007 | Yeh | |
| 2008/0170057 | A1 | 7/2008 | Park et al. | |
| 2010/0149171 | A1 * | 6/2010 | Huang et al. | 345/214 |
| 2010/0188374 | A1 * | 7/2010 | Chen et al. | 345/204 |
| 2011/0234560 | A1 * | 9/2011 | Shin et al. | 345/208 |
| 2011/0248985 | A1 | 10/2011 | Lin et al. | |
| 2011/0316901 | A1 | 12/2011 | Park et al. | |

FOREIGN PATENT DOCUMENTS

| | | | |
|---|---|---|---|
| CN | 101231807 | A | 7/2008 |
| CN | 101750815 | A | 6/2010 |

* cited by examiner

*Primary Examiner* — William Boddie
*Assistant Examiner* — Amy C Onyekaba
(74) *Attorney, Agent, or Firm* — WPAT, PC; Justin King

(57) ABSTRACT

A source-driving circuit comprises a plurality of first and second data-outputting units, a first and a second charge-sharing units and a charge-sharing switch circuit. The first and second data-outputting units have corresponding first and second output terminals respectively for outputting data signals with a first polarity and a second polarity. The first and second charge-sharing units comprise a plurality of first and second switches respectively. Each first switch is electrically connected between each two first output terminals and each two second output terminals. Each second switch is electrically connected between one of the first outputting terminals and a corresponding one of the second outputting terminals. A charge-sharing switch circuit is electrically connected to the first and second charge-sharing units for outputting a switch signal to the first and second charge-sharing units according to a polarity signal, so as to determine the on/off statuses of the first and second switches.

16 Claims, 11 Drawing Sheets

SOURCE-DRIVING CIRCUIT, DISPLAY APPARATUS AND OPERATION METHOD THEREOF

FIELD OF THE INVENTION

The present invention relates to a power-saving technology for display apparatus, and more particularly to a power-saving technology adapted to a display apparatus with a half-source driving structure.

BACKGROUND OF THE INVENTION

There is a half-source driving (HSD) structure in pixel array structures of display panels. The HSD structure doubles an amount of scan lines to halve an amount of data lines. Since the amount of the data lines is halved, an amount of driving channels of a source driver is correspondingly halved. Therefore, the cost of the related hardware is decreased.

Table 1 shows power consumptions of a conventional display panel with HSD structure operating in different operation modes.

TABLE 1

| | dot inversion(comprising two dots inversion) | | line inversion | | |
|---|---|---|---|---|---|
| image mode | current consumption (mA) | power consumption (P) | current consumption (mA) | power consumption (P) | power-saving efficiency |
| black image | 43.5 | 398.6 | 14.0 | 129.2 | 67.6% |
| white image | 19.0 | 175.1 | 15.0 | 138.3 | 21.0% |
| mosaic image | 31.4 | 288.5 | 15.0 | 138.4 | 52.0% |
| H | 42.4 | 388.6 | 21.0 | 193.4 | 50.2% |
| red + green | 41.0 | 375.9 | 42.5 | 389.5 | −3.6% |
| green + blue | 41.0 | 375.9 | 42.2 | 386.8 | −2.9% |
| blue + red | 41.0 | 375.9 | 42.2 | 386.8 | −2.9 |
| red image | 49.2 | 450.3 | 42.0 | 385.0 | 14.5% |
| green image | 49.1 | 449.4 | 42.0 | 385.0 | 14.3% |
| blue image | 49.0 | 448.4 | 42.0 | 385.0 | 14.2% |

From Table 1, it can be seen that when the display panel with the HSD structure displays a single-color image, an excellent power-saving efficiency can be obtained if the display panel operates in the line inversion mode. When the display panel with the HSD structure displays a complementary-color image, an excellent power-saving efficiency can be obtained if the display panel operates in the dot inversion (comprising two dots inversion) mode.

SUMMARY OF THE INVENTION

The present invention relates to a source-driving circuit, which is adapted to a display apparatus for driving a display panel thereof.

The present invention also relates to a display apparatus with a high power-saving efficiency.

The present invention further relates to an operation method for a display apparatus, which can make a display panel with an HSD structure have a high power-saving efficiency.

The present invention provides a source-driving circuit, which comprises a plurality of first data-outputting units, a plurality of second data-outputting units, a first charge-sharing unit, a second charge-sharing unit and a charge-sharing switch circuit. The first data-outputting units have a plurality of corresponding first output terminals respectively for outputting a plurality of data signals with a first polarity. The second data-outputting units have a plurality of corresponding second output terminals respectively for outputting a plurality of data signals with a second polarity. In addition, the first charge-sharing unit and the second charge-sharing unit comprise a plurality of first switches and a plurality of second switches respectively. Each of the first switches is electrically connected between each two of the first output terminals and each two of the second output terminals respectively. Each of the second switches is electrically connected between a corresponding one of the first outputting terminals and a corresponding one of the second outputting terminals. A charge-sharing switch circuit is electrically connected to the first charge-sharing unit and the second charge-sharing unit for outputting a switch signal to the first charge-sharing unit and the second charge-sharing unit according to a polarity signal, so as to determine the on/off statuses of the first switches and the second switches. The polarity signal is configured for indicating whether the data signals need switching the polarities thereof.

In an exemplary embodiment of the present invention, each of the first data-outputting units and the second data-outputting units comprises a first amplifier and a second amplifier. The first amplifier has a first high-voltage terminal electrically connected to a first operation voltage, a first low-voltage terminal electrically connected to a second operation voltage and electrically connected to a ground through a first capacitor, and a first amplifier output terminal electrically connected to a corresponding one of the first output terminals or a corresponding one of the second output terminals and electrically connected to the ground through a second capacitor. Similarly, the second amplifier has a second high-voltage terminal electrically connected to the first low-voltage terminal, a second low-voltage terminal electrically connected to the ground, and a second amplifier output terminal electrically connected to a corresponding one of the first output terminals or a corresponding one of the second output terminals and electrically connected to the ground through a third capacitor.

From another view, the present invention also provides a display apparatus, which comprises a pixel array, a gate-driving circuit and a source-driving circuit. The pixel array is composed of a plurality of pixel units arranged in an array, and each of the pixel units comprises three sub-pixel units. In addition, the gate-driving circuit is electrically connected to the pixel array through a plurality of scan lines. Each of the scan lines is electrically connected to a part of the sub-pixel units in each row. Specifically, the source-driving circuit is configured for receiving a plurality of polarity signals and has a plurality of first data-outputting terminals and a plurality of second data-outputting terminals. The first data-outputting terminals and the second data-outputting terminals re divided into a plurality of groups. Each of the first data-outputting terminals and the second data-outputting terminals is electrically connected to a corresponding one of a plurality of data lines for outputting data signals with a first polarity and data signals with a second polarity to the data lines, so as to transmit the data signals to the pixel array through the data lines. Each of the data lines is further electrically connected to at least a part of the sub-pixel units in two adjacent columns, and each of the polarity signals is configured for indicating whether the data signals of a corresponding one of the groups need switching the polarities thereof. When one of the polarity signals is in a first status at a sampling point, the source-driving circuit makes the first data-outputting terminals in a corresponding one of the groups connect with each other and makes the second data-outputting terminals in the same group connect with each other. When one of the polarity signals is in a second status at the sampling point, the source-driving circuit makes each of the first data-outputting terminals connect with a corresponding one of the second data-outputting terminals.

In an exemplary embodiment of the present invention, each of the groups comprises at least three first data-outputting terminals and at least three second data-outputting terminals, and the first data-outputting terminals and the second data-outputting terminals in each group are interlaced with each other.

From another view, the present invention further provides an operation method for a display apparatus. The operation method comprises the following steps: outputting data signals with a first polarity from a plurality of first data-outputting terminals respectively; outputting data signals with a second polarity from a plurality of second data-outputting terminals respectively, wherein the first data-outputting terminals and the second data-outputting terminals are divided into a plurality of groups; checking the status of at least one polarity signal; connecting the first data-outputting terminals in one of the groups with each other and connecting the second data-outputting terminals in the same group with each other when the polarity signal is in a first status at a sampling point; and connecting one of the first data-outputting terminals with a corresponding one of the second data-outputting terminals when the polarity signal is in a second status at the sampling point.

In an exemplary embodiment of the present invention, when at least a part of an image displayed by the display apparatus operates in a line inversion mode, the polarity signal corresponding to the part of the image operating in the line inversion mode is in the first status. In addition, when at least a part of an image displayed by the display apparatus operates in a dot inversion mode, the polarity signal corresponding to the part of the image operating in the dot inversion mode is in the second status.

The present invention connects the first data-outputting terminals in the same group with each other and connects the second data-outputting terminals in the same group with each other when the polarity signal is in the first status. In addition, the present invention connects one of the first data-outputting terminals with a corresponding one of the second data-outputting terminals when the polarity signal is in the second status. Therefore, no matter whether the display panel operates in the line inversion mode when it displays the single-color image or operates in the dot inversion mode or the two-dot inversion mode when it displays the complementary-color image, the present invention still can share the charges, so as to reduce the power consumption.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
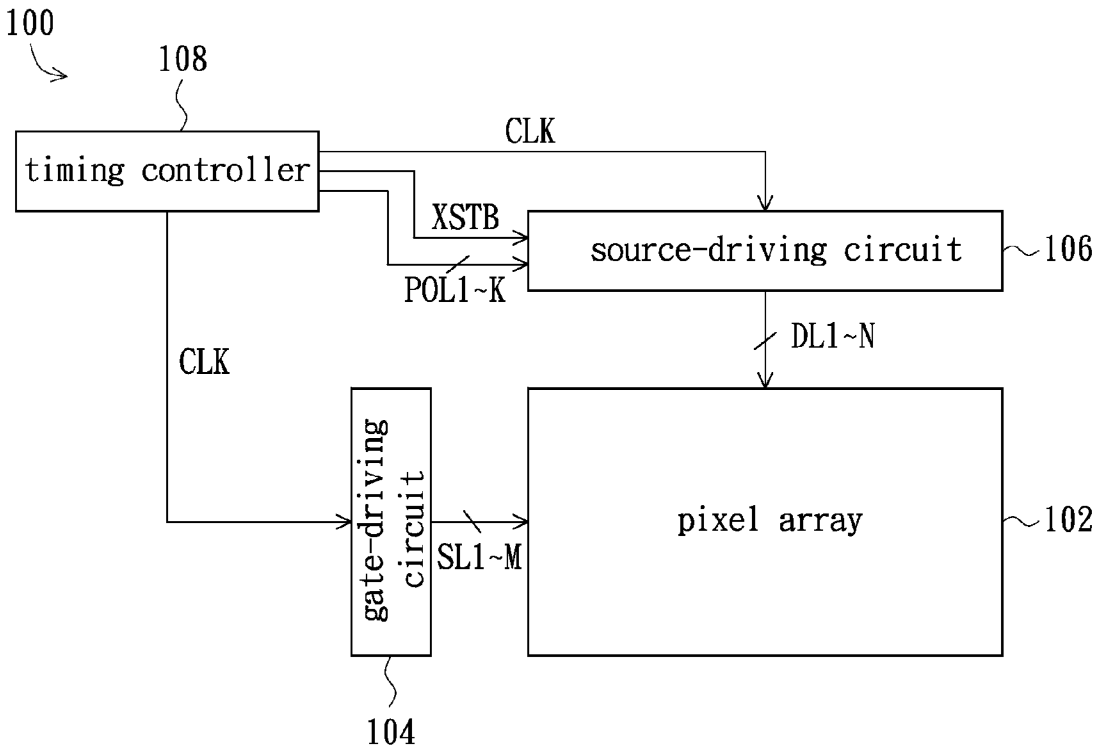
FIG. 1 shows a system block diagram of a display apparatus in accordance with an exemplary embodiment of the present invention.

FIG. 1 shows a system block diagram of a display apparatus in accordance with an exemplary embodiment of the present invention. Referring to FIG. 1, the display apparatus 100 of the exemplary embodiment comprises a pixel array 102, a gate-driving circuit 104, a source-driving circuit 106 and a timing controller 108. The pixel array 102 is composed of a plurality of pixel units which are arranged in an array. In addition, the gate-driving circuit 104 is electrically connected to the pixel array 102 through a plurality of scan lines SL1~M. Correspondingly, the source-driving circuit 106 is electrically connected to the pixel array 102 through a plurality of data lines DL1~N. M and N are positive integers larger than 1. In addition, the timing controller 108 is electrically connected to the gate-driving circuit 104 and the source-driving circuit 106.

In the exemplary embodiment, the timing controller 108 outputs a clock signal CLK to the gate-driving circuit 104 and the source-driving circuit 106. Thus, the gate-driving circuit 104 and the source-driving circuit 106 output a plurality of scan signals and a plurality of data signals according to the clock signal CLK respectively, so as to drive the pixel array 102 for displaying images. In addition, the timing controller 108 further outputs a display controlling signal XSTB and a plurality of polarity signals POL1~K to the source-driving circuit 106. K is an integer larger than 1 and less than N. In addition, the display controlling signal XSTB is configured for determining whether the source-driving circuit 106 outputs the data signals. In other words, when the display controlling signal XSTB is enabled, the source-driving circuit 106 will output the data signals.

Figure 2:
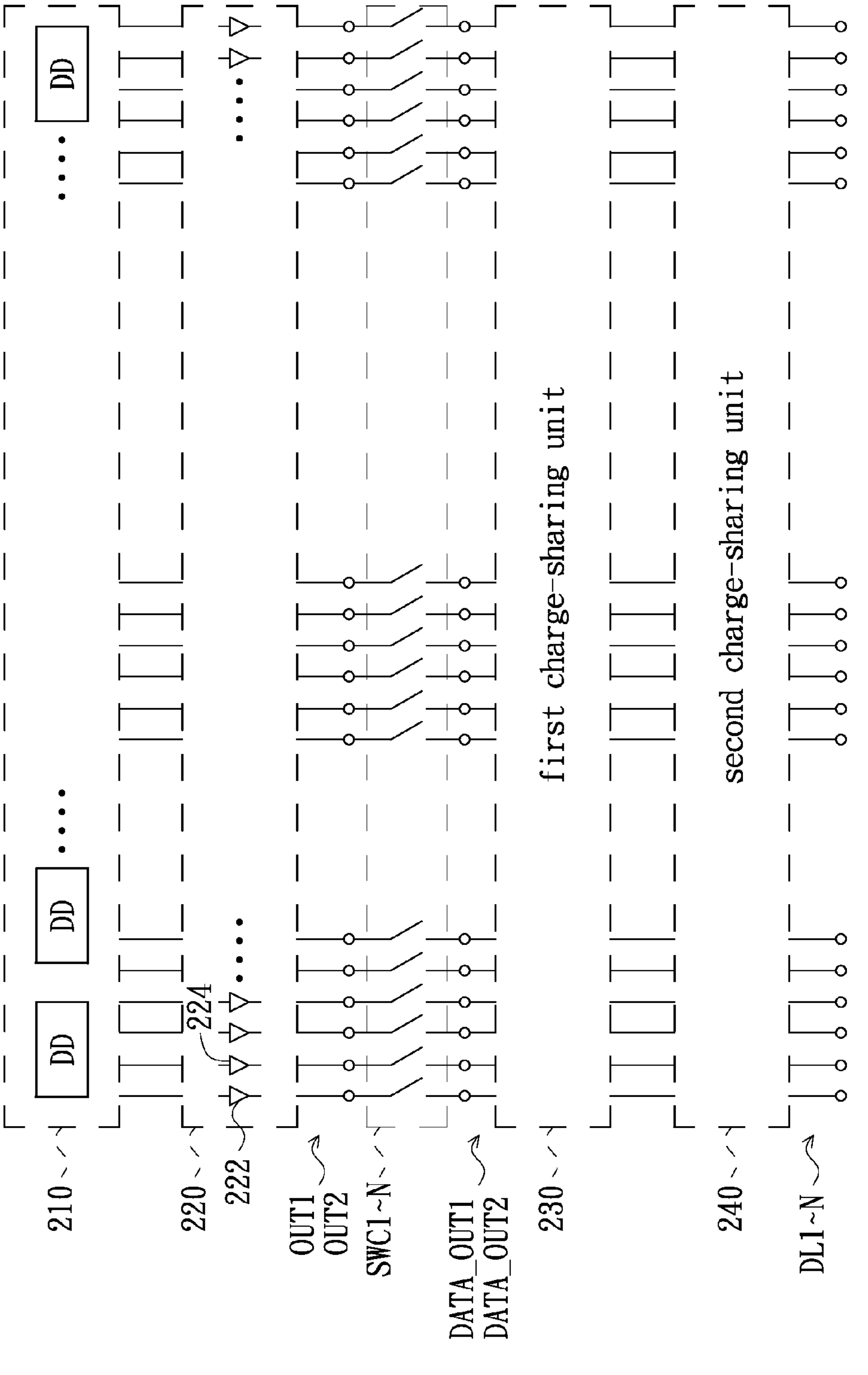
FIG. 2 shows a block diagram of a source-driving circuit in accordance with an exemplary embodiment of the present invention.

FIG. 2 shows a block diagram of a source-driving circuit in accordance with an exemplary embodiment of the present invention. Referring to FIG. 2, in the exemplary embodiment, the source-driving circuit 106 comprises a source-driving group 210, a data-outputting group 220, a first charge-sharing unit 230, a second charge-sharing unit 240, a plurality of third switches SWC1~N and a plurality of charge-sharing switch units (e.g., a charge-sharing switch unit 322 as shown in FIG. 3). The source-driving group 210 comprises a plurality of source drivers DD, and the data-outputting group 220 comprises a plurality of first data-outputting units (e.g., the data-outputting units 222) and a plurality of second data-outputting units (e.g., the data-outputting units 224). Input terminals of the first data-outputting units and the second data-outputting units are electrically connected to the output terminals of the source drivers DD respectively, and the output terminals of the first data-outputting units and the second data-outputting units correspond to a plurality of first output terminals OUT1 and a plurality of second output terminals OUT2 respectively. In the exemplary embodiment, the first data-outputting units and the second data-outputting units are interlaced.

Referring to FIG. 2 again, each of the first output terminals OUT1 and the second output terminals OUT2 is electrically connected to a corresponding one of a plurality of first data-outputting terminals DATA_OUT1 and a plurality of second data-outputting terminals DATA_OUT2 through a corresponding one of the third switches SWC1~N. In addition, the first data-outputting terminals DATA_OUT1 and the second data-outputting terminals DATA-OUT2 are further electrically connected to the first charge-sharing unit 230 and the second charge-sharing unit 240. The first charge-sharing unit 230 and the second charge-sharing unit 240 comprise a plurality of first switches (e.g., $SWA_{p-1}$, $SWA_p$, $SWA_{p+1}$ and $SWA_{p+2}$ as shown in FIG. 3) and a plurality of second switches (e.g., $SWB_{q-1}$, $SWB_q$ and $SWB_{q+1}$ as shown in FIG. 3) respectively.

Figure 3A:
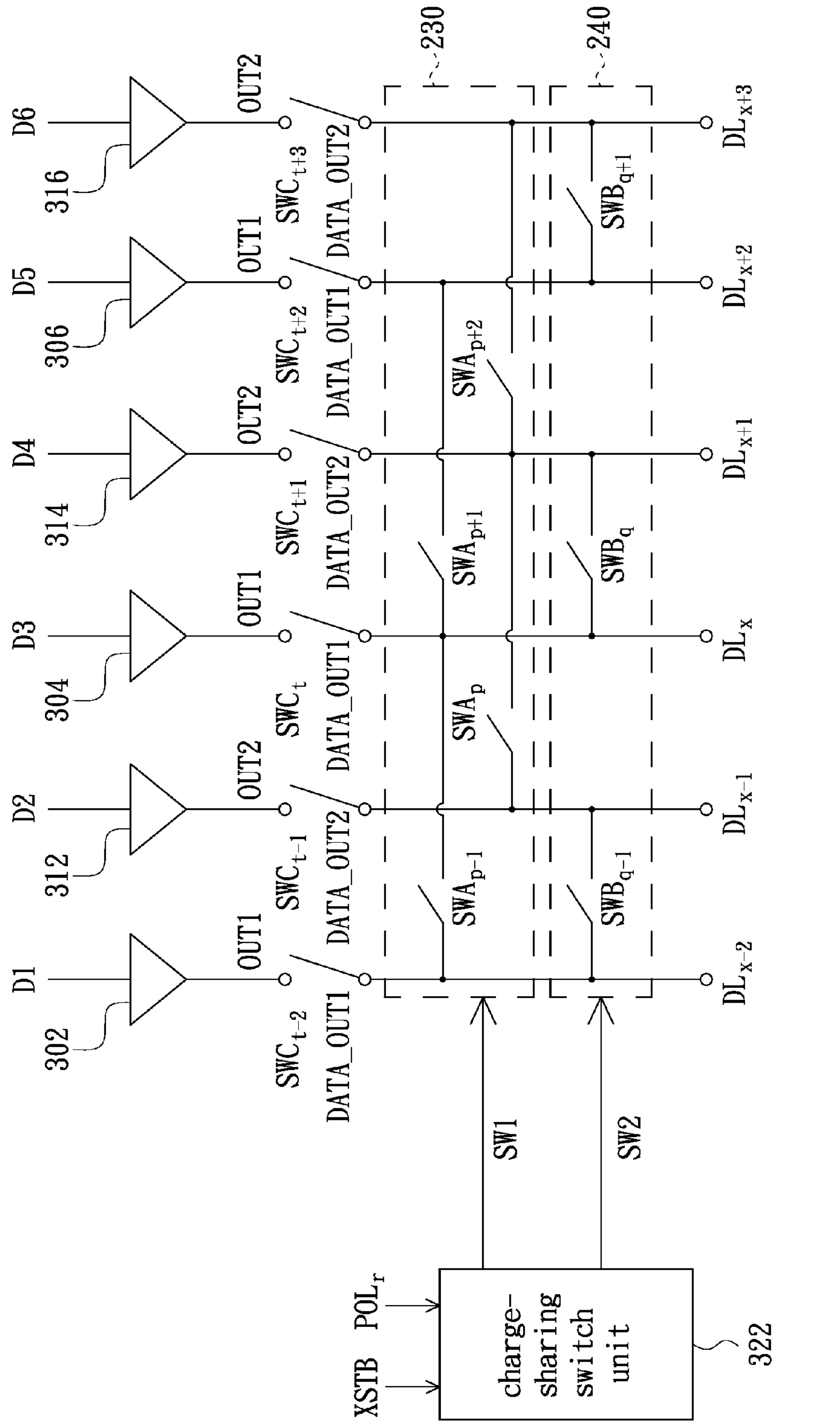
FIG. 3A is a circuit diagram of a group in accordance with an exemplary embodiment of the present invention.

Specifically, in the exemplary embodiment, the first data-outputting units and the second data-outputting units of the data-outputting group 220 are divided into a plurality of groups. FIG. 3A is a circuit diagram of a group in accordance with an exemplary embodiment of the present invention. Referring to FIGS. 2 and 3A, the group of the exemplary embodiment comprises a plurality of first data-outputting units 302, 304 and 306, and a plurality of second data-outputting units 312, 314 and 316. An input terminal of each of the data-outputting units 302, 304, 306, 312, 314 and 316 is electrically connected to a corresponding one of the source drivers DD respectively for receiving a corresponding one of data signals D1, D2, D3, D4, D5 and D6 respectively. The data signals D1, D3 and D5 have a first polarity respectively, and the data signals D2, D4 and D6 have a second polarity respectively.

In addition, the output terminal of each of the first data-outputting units 302, 304 and 306 is electrically connected to a corresponding one of the first output terminals OUT1 and electrically connected to a corresponding one of the first data-outputting terminals DATA_OUT1 through a corresponding one of the third switches $SWC_{t-2}$, $SWC_t$ and $SWC_{t+2}$. Similarly, the output terminal of each of the second data-outputting units 312, 314 and 316 is electrically connected to a corresponding one of the second output terminals OUT2 and electrically connected to a corresponding one of the second data-outputting terminals DATA_OUT2 through a corresponding one of the third switches $SWC_{t+1}$, $SWC_{t+1}$ and $SWC_{t+3}$. When the data-outputting units 302, 304, 306, 312, 314 and 316 output the data signals D1, D2, D3, D4, D5 and D6 respectively, the third switches $SWC_{t-2}$, $SWC_{t-1}$, $SWC_t$, $SWC_{t+1}$, $SWC_{t+2}$ and $SWC_{t+3}$ are in an on status, so that the data signals D1, D2, D3, D4, D5 and D6 are transmitted from the first output terminals OUT1 and the second output terminals OUT2 to the first data-outputting terminals DATA_OUT1 and the second data-outputting terminals DATA_OUT2 respectively.

In addition, each of the data-outputting units 302, 304, 306, 312, 314 and 316 is further electrically connected to the first charge-sharing unit 230 and the second charge-sharing unit 240 through a corresponding one of the first data-outputting terminals DATA_OUT1 and the second data-outputting terminals DATA_OUT2. In the exemplary embodiment, the first charge-sharing unit 230 comprises the first switches $SWA_{p-1}$, $SWA_p$, $SWA_{p+1}$ and $SWA_{p+2}$. The first switches $SWA_{p-1}$ and $SWA_{p+1}$ are configured for electrically connecting the first data-outputting terminals DATA_OUT1 corresponding to the first data-outputting units 302, 304 and 306 with each other. On the contrary, the first switches $SWA_p$ and $SWA_{p+2}$ are configured for electrically connecting the second data-outputting terminals DATA_OUT2 corresponding to the second data-outputting units 312, 314 and 316 with each other.

In addition, the second charge-sharing unit 240 comprises the second switches $SWB_{q-1}$, $SWB_q$ and $SWB_{q+1}$. The second switcher $SWB_{q-1}$ is configured for electrically connecting the first data-outputting terminal DATA_OUT1 corresponding to the first data-outputting unit 302 with the second data-outputting terminal DATA_OUT2 corresponding to the second data-outputting unit 312. The second switcher $SWB_q$ is configured for electrically connecting the first data-outputting terminal DATA_OUT1 corresponding to the first data-outputting unit 304 with the second data-outputting terminal DATA_OUT2 corresponding to the second data-outputting unit 314. The second switcher $SWB_{q+1}$ is configured for electrically connecting the first data-outputting terminal DATA_OUT1 corresponding to the first data-outputting unit 306 with the second data-outputting terminal DATA_OUT2 corresponding to the second data-outputting unit 316. In the exemplary embodiment, p, q and t are all positive integers respectively, and t is larger than 1 and less than n.

Referring to FIGS. 2 and 3 again, each of the groups further comprises one of the charge-sharing switch units such as the charge-sharing switch unit 322. In the exemplary embodiment, the charge-sharing switch unit 322 outputs a first switch signal SW1 and a second switch signal SW2 to the first charge-sharing unit 230 and the second charge-sharing unit 240 respectively according to the display controlling signal XSTB and one of the polarity signals $POL_r$, thereby controlling the on/off statuses of the first switches $SWA_{p-1}$, $SWA_p$, $SWA_{p+1}$ and $SWA_{p+2}$, and controlling the on/off statuses of the second switches $SWB_{q-1}$, $SWB_q$ and $SWB_{g+1}$. Wherein, r is an integer larger or equal to 1 and less or equal to K.

In addition, the data signals D1~D6 received by each of the groups are transmitted to the pixel array 102 as shown in FIG. 1 through the corresponding data lines $DL_{x-2}$, $DL_{x-1}$, $DL_x$, $DL_{x+1}$, $DL_{x+2}$ and $DL_{x+3}$ respectively. Wherein, x is a positive integer larger or equal to 1 and less or equal to N.

Figure 3B:
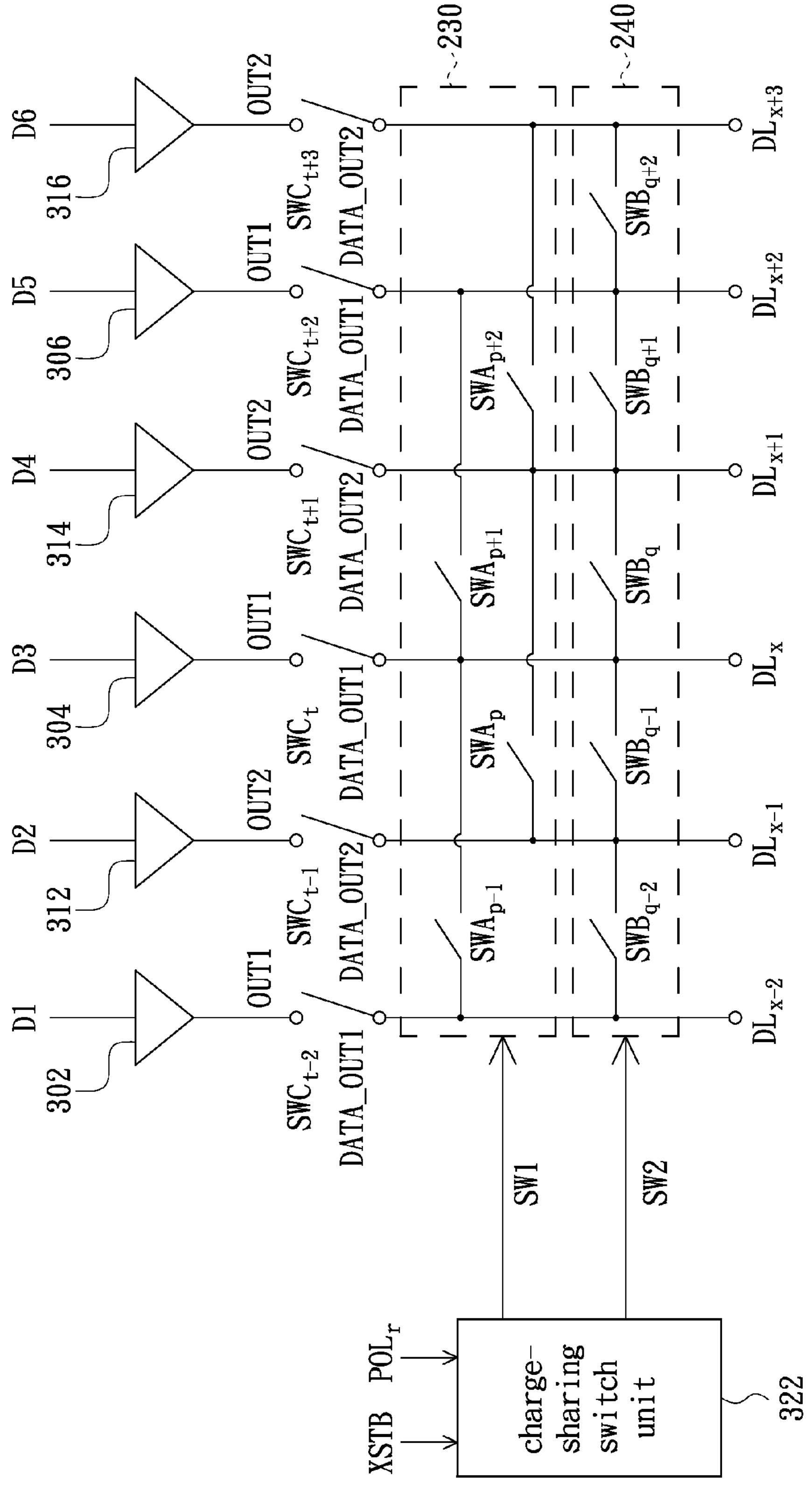
FIG. 3B is a circuit diagram of a group in accordance with another exemplary embodiment of the present invention.

FIG. 3B is a circuit diagram of a group in accordance with another exemplary embodiment of the present invention. Referring to FIG. 3B, the exemplary embodiment shown in FIG. 3B is similar to that of FIG. 3A except that the second charge-sharing unit 240 further comprises second switches $SWB_{q-2}$ and $SWB_{q+2}$. The second switches $SWB_{q-2}$, $SWB_{q-1}$, $SWB_q$, $SWB_{q+1}$, and $SWB_{q+2}$ are configured for electrically connecting each of the first data-outputting terminals DATA_OUT1 with an adjacent one of the second data-outputting terminals DATA_OUT2.

Figure 4A:
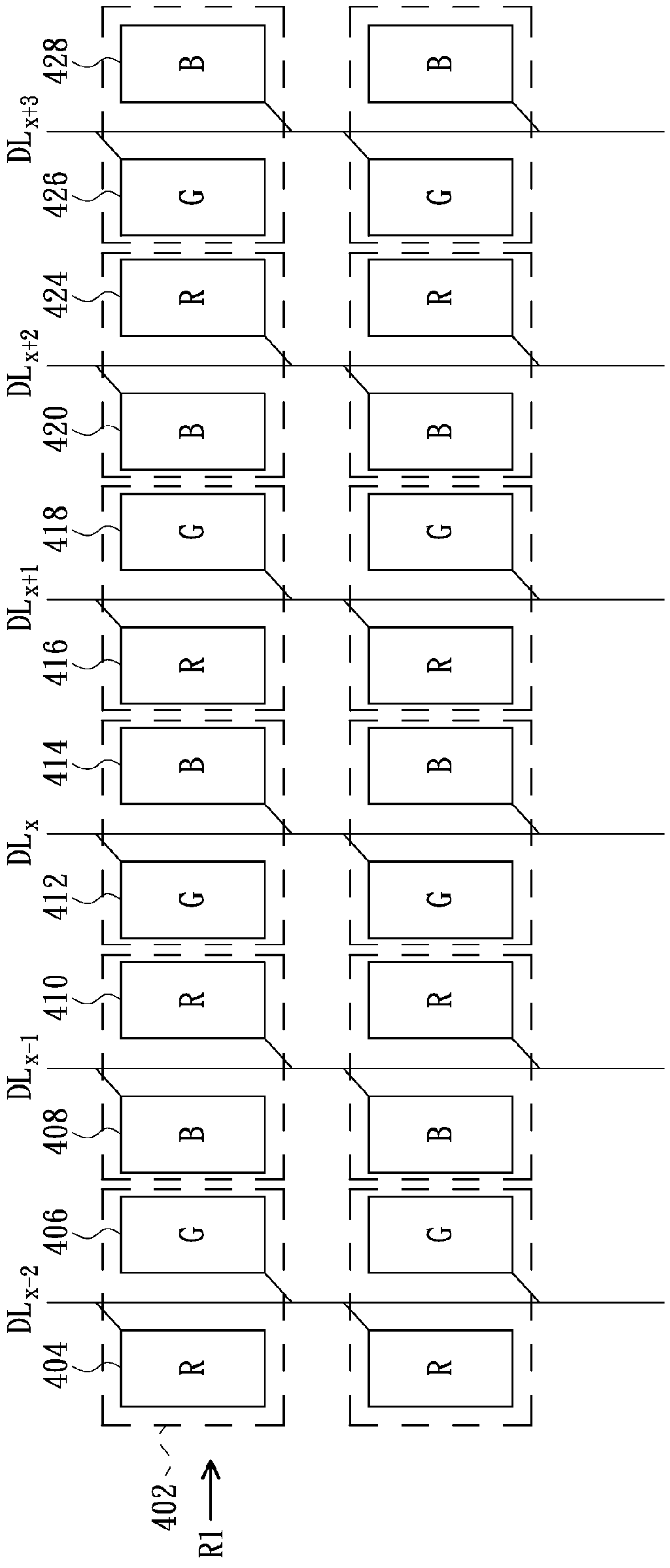
FIG. 4A is a schematic view of a pixel array in accordance with an exemplary embodiment of the present invention.

FIG. 4A is a schematic view of a pixel array in accordance with an exemplary embodiment of the present invention. Referring to FIGS. 1 and 4A, the pixel array 102 is composed of a plurality of pixel units such as pixel unit 402, which are arranged in an array. In the exemplary embodiment, each of the pixel units of the pixel array 102 comprises a first sub-pixel unit (e.g., the sub-pixel unit 404) and a second sub-pixel unit (e.g., the sub-pixel unit 406). It is well known that in FIG. 4A the sub-pixel unit R represents a red sub-pixel unit, the sub-pixel unit G represents a green sub-pixel unit, and the sub-pixel unit B represents a blue sub-pixel unit. In the exemplary embodiment, each of the data lines $DL_{x-2}$, $DL_{x-1}$, $DL_x$, $DL_{x+1}$, $DL_{x+2}$ and $DL_{x+3}$ is electrically connected with the first sub-pixel units and the second sub-pixel units of the pixel units arranged in a corresponding column. On the other hand, each of data lines $DL_{x-2}$, $DL_{x-1}$, $DL_x$, $DL_{x+1}$, $DL_{x+2}$ and $DL_{x+3}$ is electrically connected with all of the sub-pixel units which are arranged in two adjacent columns.

Figure 4B:
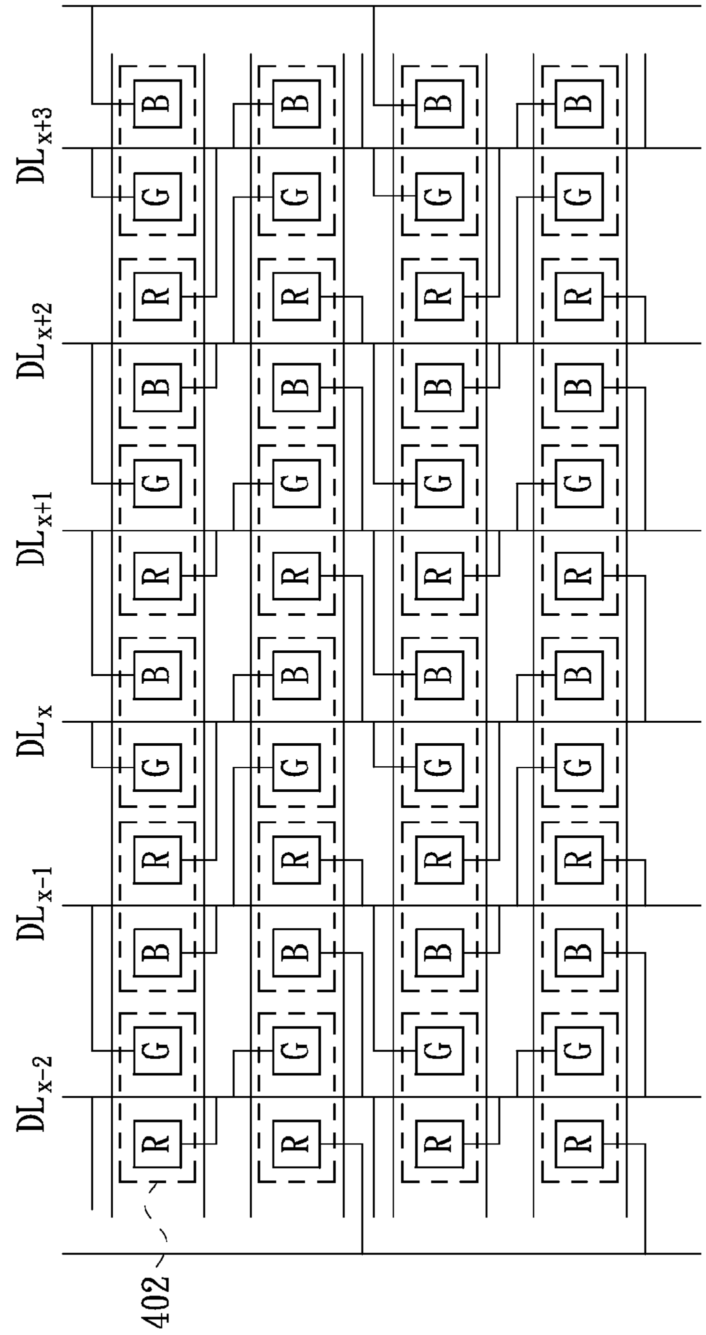
FIG. 4B is a schematic view of a pixel array in accordance with another exemplary embodiment of the present invention.

FIG. 4B is a schematic view of a pixel array in accordance with another exemplary embodiment of the present invention. Referring to FIG. 4B, in the exemplary embodiment, each of the pixel units also comprises a first sub-pixel unit and a second sub-pixel unit except that each of the data lines $DL_{x-2}$, $DL_{x-1}$, $DL_x$, $DL_{x+1}$, $DL_{x+2}$ and $DL_{x+3}$ is electrically connected with a part of the sub-pixel units which are arranged in two adjacent columns. In addition, each of the scan lines is electrically connected with a part of the sub-pixel units in a corresponding row.

Although the above description provides some different schematic views of the pixel array 102, they still have a common point that the same data line drives the sub-pixel units with different colors at different times. Therefore, the pixel array 102 having the common point can be adapted to the present invention, and the present invention is not limited herein.

Figure 5:
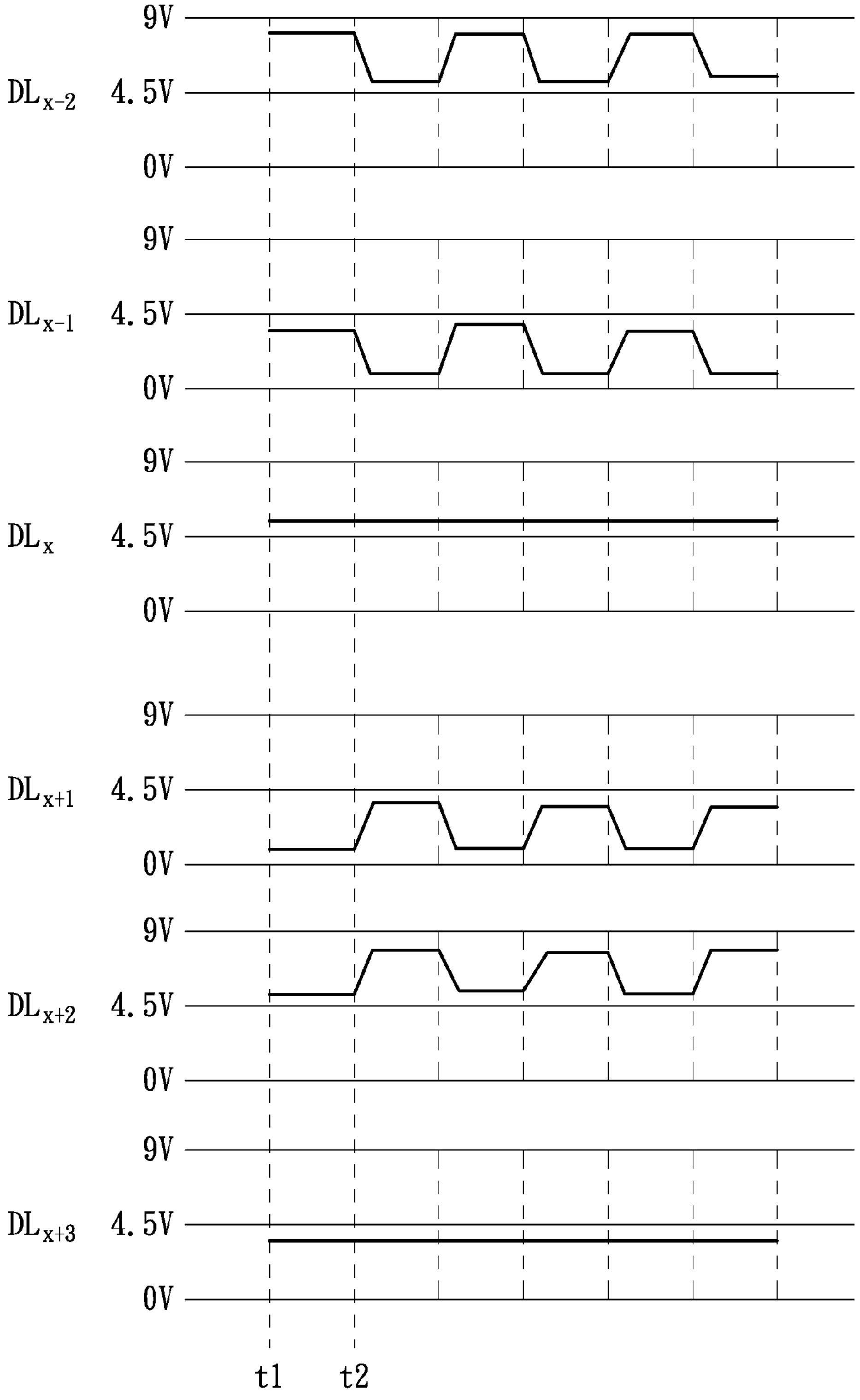
FIG. 5 shows a waveform of a data signal in accordance with an exemplary embodiment of the present invention.

From the table 1 it can be seen that the pixel array 102 consumes more power when it operates in the line inversion mode. Therefore, when the pixel units operate in the line inversion mode, the waves of the potentials of the data lines $DL_{x-2}$, $DL_{x-1}$, $DL_x$, $DL_{x+1}$, $DL_{x+2}$ and $DL_{x+3}$ are as shown in FIG. 5. Referring to FIGS. 4A and 5, if the potential of the data signal applied to each of the pixel units of the pixel array 102 is closer to an intermediate potential (such as 4.5V), the liquid crystal molecules of the pixel units are in a perpendicular status, so that the pixel array 102 displays a white image at the moment. On the contrary, if the potential of the data signal is far from the intermediate potential, the liquid crystal molecules of the pixel units are in a horizontal status, so that the pixel array 102 displays a black image at the moment.

In addition, when the potential of the data line is larger than the intermediate potential, it is defined as the positive polarity. On the contrary, when the potential of the data line is less than the intermediate potential, it is defined as the negative polarity.

Figure 6A:
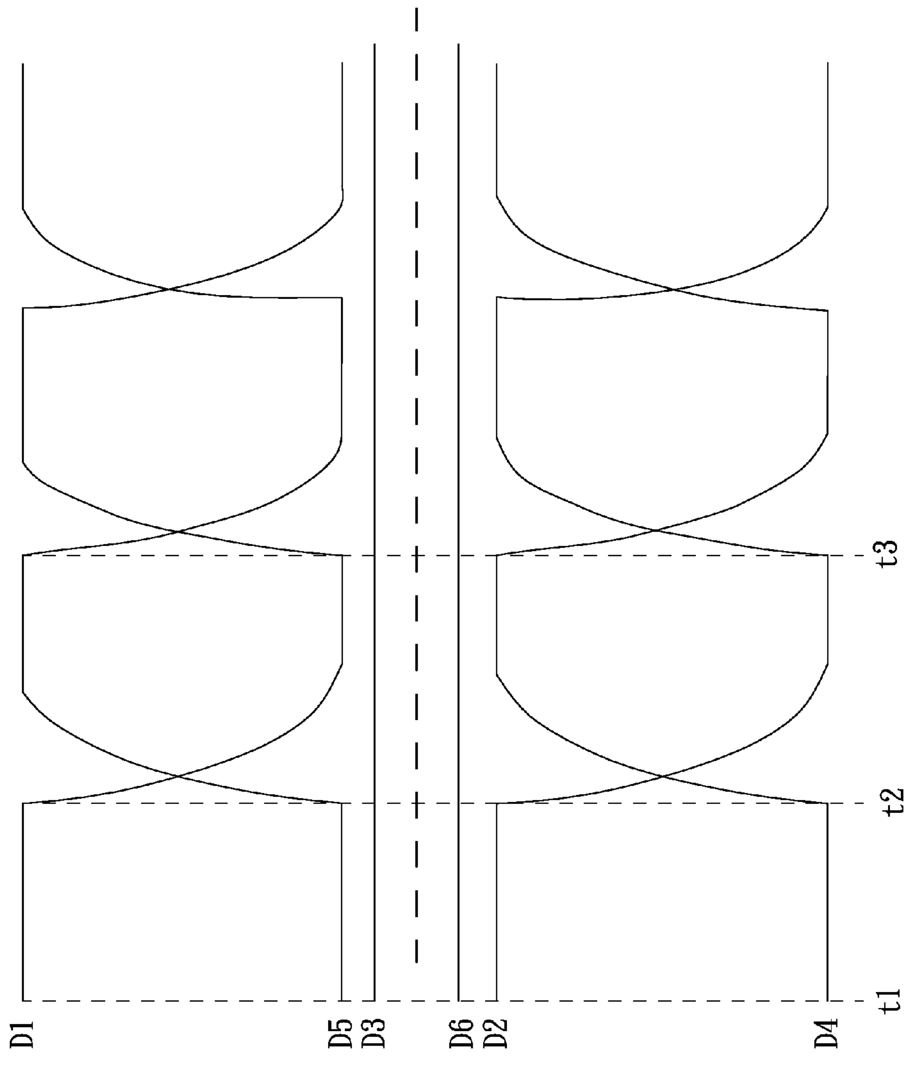
FIG. 6A shows the waveforms of the data signals without using the charge-sharing technology in accordance with an exemplary embodiment of the present invention.

FIG. 6A shows the waveforms of the data signals without using the charge-sharing technology in accordance with an exemplary embodiment of the present invention. Referring to FIGS. 4 and 6, a scan signal is transmitted to all of the sub-pixel units in a R1-th row during a period from t1 to t3, so as to turn on the sub-pixel units. During a period from t1 to t2, the potentials of the data signals D1, D2, D3, D4, D5 and D6 are about 8V, 4V, 5V, 1V, 5V and 4V respectively. Therefore, the sub-pixel units R404 and R416 are in a dark status, and the sub-pixel units G412 and G426 and the sub-pixel units B408 and B420 are in a bright status.

During a period from t2 to t3, the potentials of the data signals D1, D2, D4 and D5 are switched to be 5V, 1V, 4V and 8V respectively, and the potential of the data signals D3 and D6 keep unchanging. Therefore, the sub-pixel units R410 and R424 are in the dark status, and the sub-pixel units G406 and G418 and the sub-pixel units B414 and B428 are all in the bright status. Thus, the above object can be obtained.

Referring to FIGS. 3 and 5, it can be seen from FIG. 5 that the data signals of the data lines $DL_{x-2}$ and $DL_{x+2}$ have the same polarity, the data signals of the data lines $DL_{x-1}$ and $DL_{x+1}$ have the same polarity, and the data signals of the data lines $DL_x$ and $DL_{x+3}$ are neutral. Therefore, the exemplary embodiment uses the charge-sharing technology for saving power.

Figure 7:
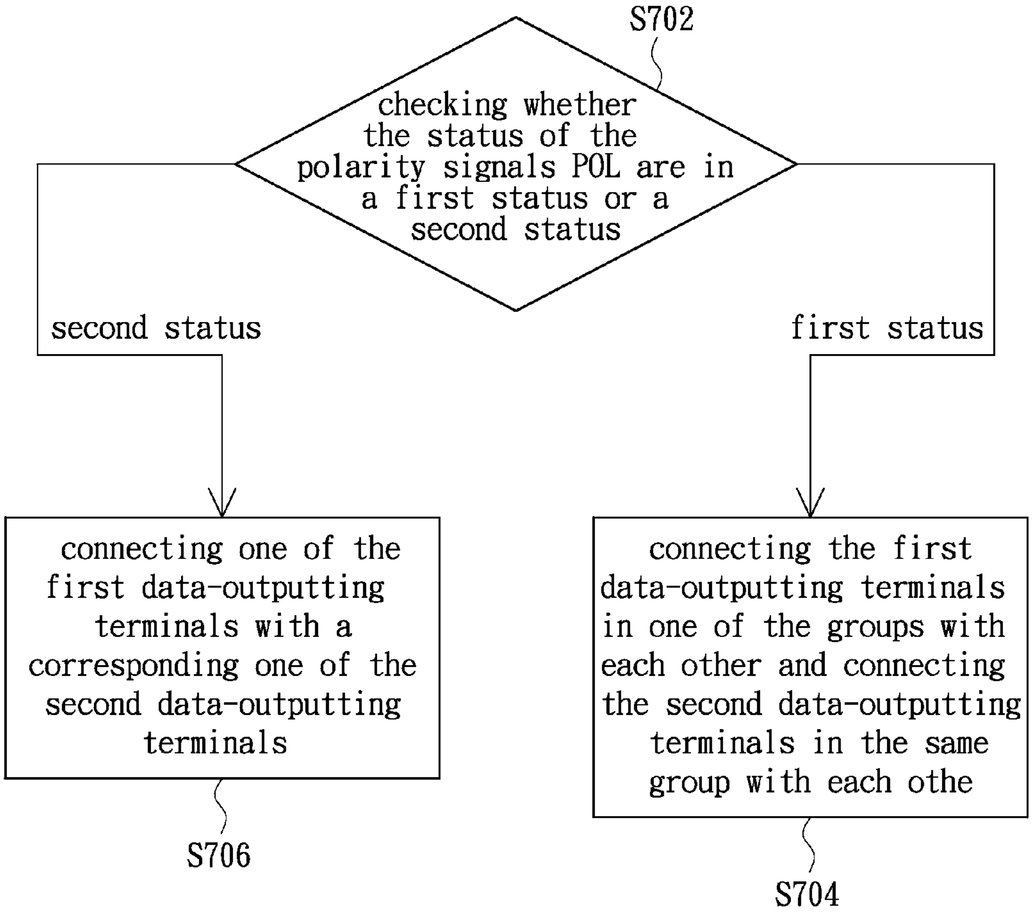
FIG. 7 is a flow chart of an operation method for a display apparatus in accordance with an exemplary embodiment of the present invention.

FIG. 7 is a flow chart of an operation method for a display apparatus in accordance with an exemplary embodiment of the present invention. Referring to FIGS. 3 and 7, in the exemplary embodiment, the charge-sharing switch unit 322 performs Step S702, that is, checking whether the status of the polarity signals POL are in a first status or a second status. Wherein, the polarity signal $POL_r$ is configured for indicating whether to switch the polarities of the data signals D1, D2, D3, D4, D5 and D6.

Figure 6B:
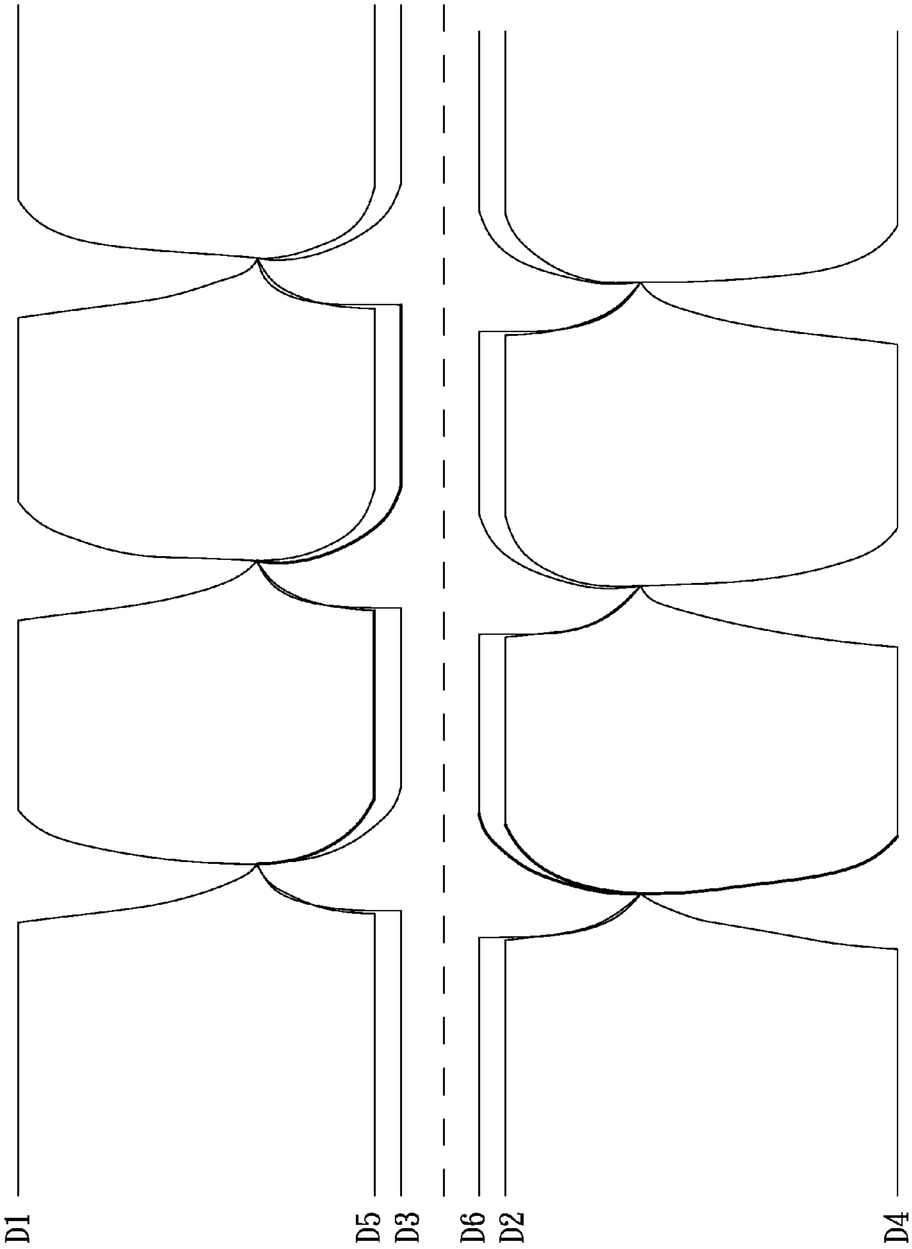
FIG. 6B shows the waveforms of the data signals using the charge-sharing technology in accordance with an exemplary embodiment of the present invention.
Figure 8:
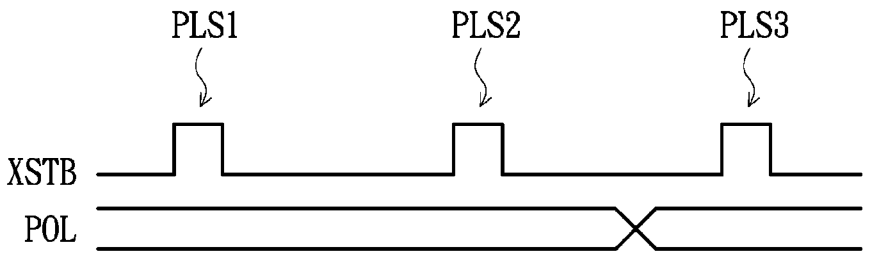
FIG. 8 shows waveforms of a display controlling signal and a polarity signal in accordance with an exemplary embodiment of the present invention.

FIG. 8 shows waveforms of a display controlling signal and a polarity signal in accordance with an exemplary embodiment of the present invention. Referring to FIGS. 3, 7 and 8, when at least a part of the image displayed on the display apparatus of the present invention is a single-color image or a compensation image, and the corresponding pixel units operate in the line inversion mode or the two-dot inversion mode, the polarity signal $POL_r$ keeps unchanging the status thereof between two adjacent sampling points. In the exemplary embodiment, it will sample the polarity signal $POL_r$ at each of the rising edges of the pulses of the display controlling signal XSTB, so as to form the sampling points. Therefore, when the polarity signal $POL_r$ keeps unchanging the status thereof between the two adjacent sampling points, the corresponding pixel units will operate in the line inversion mode, and the charge-sharing switch unit 322 will determine that the polarity signal $POL_r$ is in the first status. Thus, the charge-sharing switch unit 322 outputs the switch signal SW1 to enable the first switches $SWA_p$, $SWA_{p+1}$, $SWA_{p+2}$ and $SWA_{p-1}$, so that the first data-outputting terminals DATA_OUT1 of each of the groups are connected with each other, and the second data-outputting terminals DATA_OUT2 thereof are connected with each other, which is described in Step S704. At the moment, a charge-sharing effect is formed as shown in FIG. 6B.

In addition, when the status of the polarity signal $POL_r$ is switched between the two adjacent sampling points, the charge-sharing switch unit 322 will determine that the polarity signal POL is in the second status and then output the second switch signal SW2. At the moment, the second switches $SWB_{q-1}$, $SWB_q$ and $SWB_{q+1}$ are turned on. Therefore, each of the first data-outputting terminals DATA_OUT1 of the groups is connected with an adjacent one of the second data-outputting terminals DATA_OUT2 (Step S706). Alternatively, as shown in FIG. 3B, each of the first data-outputting terminals DATA_OUT1 is connected with an adjacent one of the second data-outputting terminals DATA_OUT2. Therefore, when the pixel array 102 displays a color image, the power can be saved.

Figure 9:
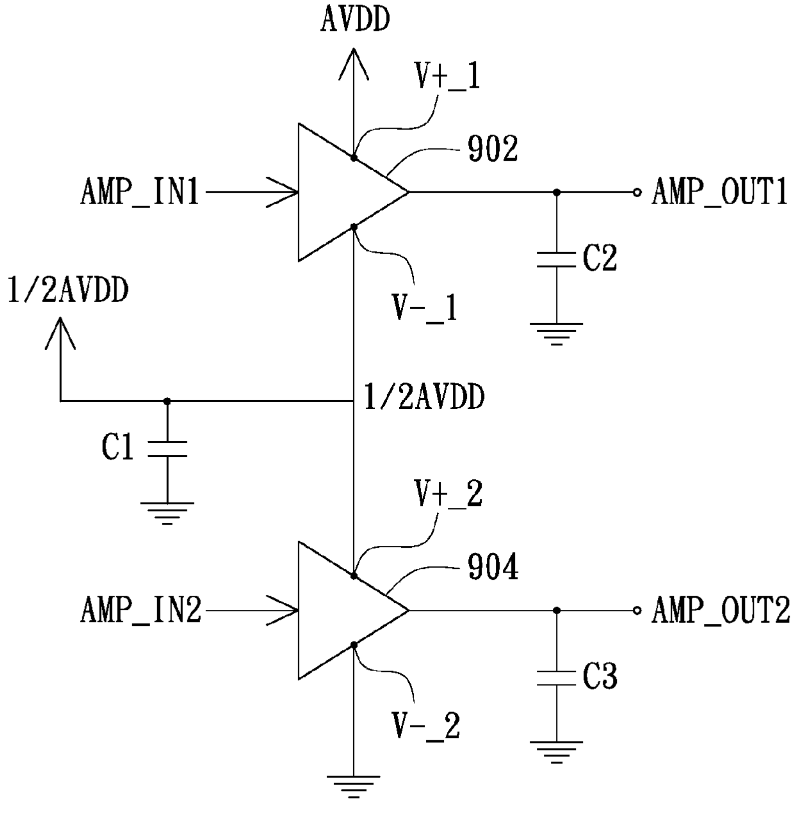
FIG. 9 shows an inner circuit diagram of a data-outputting unit in accordance with an exemplary embodiment of the present invention.

FIG. 9 shows an inner circuit diagram of a data-outputting unit in accordance with an exemplary embodiment of the present invention. In the exemplary embodiment, each of the data-outputting units comprises a first amplifier 902 and a second amplifier 904. The first amplifier 902 and the second amplifier 904 receive the data signals from amplifier input terminals AMP_IN1 and AMP_IN2 respectively. In addition, the amplifier output terminal AMP_OUT1 of the first amplifier 902 and the amplifier output terminal AMP_OUT2 of the second amplifier 904 are electrically connected to one of the first output terminals OUT1 or one of the second output terminals OUT2 respectively. In addition, the amplifier output terminal AMP_OUT1 of the first amplifier 902 and the amplifier output terminal AMP_OUT2 of the second amplifier 904 are electrically connected to the ground through the capacitors C2 and C3 respectively.

In addition, the first amplifier 902 and the second amplifier 904 further comprise high-voltage terminals V+_1 and V+_2, and low-voltage terminals V−_1 and V−_2 respectively. The high-voltage terminal V+_1 of the first amplifier 902 is electrically connected to a first voltage such as the high voltage AVDD, and the low-voltage terminal V−_1 of the first amplifier 902 is electrically connected to a second voltage. In the exemplary embodiment, the second voltage may be a potential of ½ AVDD. In addition, the low-voltage terminal V−_1 of the first amplifier 902 is further electrically connected to the high-voltage terminal V+_2 of the second amplifier 904 and is electrically connected to the ground through a capacitor C1. The low-voltage terminal V−_2 of the second amplifier 902 is also electrically connected to the ground.

Referring to FIGS. 6A and 9, in the exemplary embodiment, the data signals with the first polarity, such as the data signals D1, D5 and D3, may be transmitted to the amplifier input terminal AMP_IN1. On the contrary, the data signals with the second polarity, such as the data signals D2, D4 and D6, may be transmitted to the amplifier input terminal AMP_IN2. This embodiment only employs the data signals D1 and D5 as an example to describe the operation principle of the inner circuit of the output unit. At a time t1, the potential of the data signal D1 is close to AVDD, and the potential of the data signal D5 is close to ½AVDD. At a time t2, the potential of the data signal D1 is switched from AVDD to about ½AVDD, and the potential of the data signal D5 is switched from ½AVDD to about AVDD. At the moment, a current is generated from the amplifier output terminal AMP_OUT1 of the first amplifier 902 to the low-voltage terminal V−_1 thereof, and the current charges the capacitor C1 until the voltage between the two terminals of the capacitor C1 achieves ½AVDD.

Then, at a time t3, the potential of the data signal D1 is switched from ½AVDD to about AVDD, and the potential of the data signal D5 is switched from AVDD to about ½AVDD. At the moment, the charge stored in the capacitor C1 is discharged from the low-voltage terminal V−_1 to the high-voltage terminal V+_2 of the second amplifier 904, and it charges the capacitor C3. Thus, the amplifier output terminal AMP_OUT1 can rapidly achieve the potential of ½AVDD by the discharging current of the capacitor C1, so as to reduce the current inputted from the high-voltage terminal V+_1 for saving the power. The above technology may be called as a charge-recycling technology.

The following shows the experimental results of the present invention in table 2:

TABLE 2

| Image mode | dot inversion mode current consumption (mA) | dot inversion mode power consumption (P) | line inversion mode current consumption (mA) | line inversion mode power consumption (P) | line inversion mode + charge-recycling technolgy current consumption (mA) | line inversion mode + charge-recycling technolgy power consumption (P) | charge-recycling technology + charge-sharing technology of the present invention current consumption (mA) | charge-recycling technology + charge-sharing technology of the present invention power consumption (P) |
|---|---|---|---|---|---|---|---|---|
| black image | 43.5 | 398.6 | 14.0 | 129.2 | 12.8 | 119.1 | 12.9 | 119.07 |
| white image | 19.0 | 175.1 | 15.0 | 138.3 | 12.6 | 116.3 | 12.6 | 116.30 |
| mosaic image | 31.4 | 288.5 | 15.0 | 138.4 | 13.0 | 120.0 | 13.0 | 119.98 |
| H | 42.4 | 388.6 | 21.0 | 193.4 | 17.4 | 160.4 | 17.4 | 160.43 |
| red + green | 41.0 | 375.9 | 42.5 | 389.5 | 27.9 | 256.5 | 23.0 | 211.00 |
| green + blue | 41.0 | 375.9 | 42.2 | 386.8 | 28.0 | 257.5 | 23.0 | 211.00 |
| blue + red | 41.0 | 375.9 | 42.2 | 386.8 | 28.0 | 257.5 | 23.0 | 211.00 |
| red image | 49.2 | 450.3 | 42.0 | 385.0 | 28.2 | 259.3 | 23.0 | 211.00 |
| green image | 49.1 | 449.4 | 42.0 | 385.0 | 28.1 | 258.4 | 23.0 | 211.00 |
| blue image | 49.0 | 448.4 | 42.0 | 385.0 | 28.0 | 257.5 | 23.0 | 211.00 |

It can be seen from table 2 that the display apparatus using the charge-sharing and charge-recycling technology of the present invention can save more power than the conventional display apparatus does.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A source-driving circuit adapted to a display apparatus, the source-driving circuit comprising:

a plurality of first data-outputting units, having a plurality of corresponding first output terminals respectively for outputting a plurality of data signals with a first polarity;

a plurality of second data-outputting units, having a plurality of corresponding second output terminals respectively for outputting a plurality of data signals with a second polarity;

a first charge-sharing unit, comprising a plurality of first switches, the first switches being divided into two groups, each of the first switches in a first group being electrically connected between two first output terminals, and each of the first switches in a second group being electrically connected between two second output terminals;

a second charge-sharing unit, comprising a plurality of second switches, each of the second switches being electrically connected between a corresponding one of the first output terminals and a corresponding one of the second output terminals; and a charge-sharing switch circuit, electrically connected to the first charge-sharing unit and the second charge-sharing unit, the charge-sharing switch circuit being configured for outputting a switch signal to the first charge-sharing unit and the second charge-sharing unit according to a polarity signal, so as to determine the on/off statuses of the first switches and the second switches, wherein the polarity signal is configured for indicating whether the data signals need switching the polarities thereof.

2. The source-driving circuit according to claim 1, wherein each of the first data-outputting units and the second data-outputting units comprises:

a first amplifier, having a first high-voltage terminal electrically connected to a first operation voltage, a first low-voltage terminal electrically connected to a second operation voltage and electrically connected to a ground through a first capacitor, and a first amplifier output terminal electrically connected to a corresponding one of the first output terminals or a corresponding one of the second output terminals and electrically connected to the ground through a second capacitor; and a second amplifier, having a second high-voltage terminal electrically connected to the first low-voltage terminal, a second low-voltage terminal electrically connected to the ground, and a second amplifier output terminal electrically connected to a corresponding one of the first output terminals or a corresponding one of the second output terminals and electrically connected to the ground through a third capacitor.

3. The source-driving circuit according to claim 2, wherein the potential of the second operation voltage is half of that of the first operation voltage.

4. A display apparatus, comprising:

a pixel array, composed of a plurality of pixel units arranged in an array, each of the pixel units comprising a plurality of sub-pixel units;

a gate-driving circuit, electrically connected to the pixel array through a plurality of scan lines, each of the scan lines being electrically connected to a part of the sub-pixel units in each row; and a source-driving circuit, configured for receiving a plurality of polarity signals and having a plurality of first data-outputting terminals and a plurality of second data-outputting terminals, the first data-outputting terminals being divided into a first group, and the second data-outputting terminals being divided into a second group, each of the first data-outputting terminals being electrically connected to a corresponding one of a plurality of data lines for outputting data signals with a first polarity, and each of the second data-outputting terminals being electrically connected to a corresponding other one of a plurality of data lines for outputting data signals with a second polarity, so as to transmit the data signals to the pixel array through the data lines, wherein each of the data lines is further electrically connected to at least a part of the sub-pixel units in two adjacent columns, each of the polarity signals is configured for indicating whether the data signals of a corresponding one of the groups need switching the polarities thereof, wherein when one of the polarity signals is in a first status at a sampling point, the source-driving circuit makes the first data-outputting terminals in the first group connect with each other and makes the second data-outputting terminals in the second group connect with each other; and when one of the polarity signals is in a second status at the sampling point, the source-driving circuit makes each of the first data-outputting terminals connect with a corresponding one of the second data-outputting terminals.

5. The display apparatus according to claim 4, wherein each of the groups comprises at least three first data-outputting terminals and at least three second data-outputting terminals, and the first data-outputting terminals and the second data-outputting terminals in each group are interlaced with each other.

6. The display apparatus according to claim 4, wherein the source-driving circuit comprises:

a plurality of first data-outputting units, having corresponding first output terminals respectively, the first output terminals being electrically connected to the first data-outputting terminals respectively for outputting data signals with a first polarity;

a plurality of second data-outputting units, having corresponding second output terminals respectively, the second output terminals being electrically connected to the second data-outputting terminals respectively for outputting data signals with a second polarity;

a plurality of first charge-sharing units, each of the first charge-sharing units comprising a plurality of first switches for electrically connecting the first data-outputting terminals of each of the groups with each other and electrically connecting the second data-outputting terminals of each of the groups with each other;

a plurality of second charge-sharing units, each of the second charge-sharing units comprising a plurality of second switches for electrically connecting each of the first data-outputting terminals to a corresponding one of the second data-outputting terminals;

a plurality of third switches, configured for electrically connecting the first data-outputting terminals and the second data-outputting terminals to the first output terminals and the second output terminals; and a plurality of charge-sharing switch units, electrically connected to the first charge-sharing units and the second charge-sharing units, each of the charge-sharing switch units being configured for outputting a switch signal to a corresponding one of the first charge-sharing units and a corresponding one of the second charge-sharing units according to one of the polarity signals, so as to determine the on/off statuses of the corresponding first switches and the corresponding second switches.

7. The display apparatus according to claim 6, wherein each of the first data-outputting units the second data-outputting units comprises:

a first amplifier, having a first high-voltage terminal electrically connected to a first operation voltage, a first low-voltage terminal electrically connected to a second operation voltage and electrically connected to a ground through a first capacitor, and a first amplifier output terminal electrically coupled to a corresponding one of the first output terminals or a corresponding one of the second output terminals and electrically connected to the ground through a second capacitor; and a second amplifier, having a second high-voltage terminal electrically connected to the first low-voltage terminal, a second low-voltage terminal electrically connected to the ground, and a second amplifier output terminal electrically connected to a corresponding one of the first output terminals or a corresponding one of the second output terminal and electrically connected to the ground through a third capacitor.

8. The display apparatus according to claim 7, wherein the potential of the second operation voltage is half of that of the first operation voltage.

9. An operation method for a display apparatus, comprising:

outputting data signals with a first polarity from a plurality of first data-outputting terminals respectively;

outputting data signals with a second polarity from a plurality of second data-outputting terminals respectively, wherein the first data-outputting terminals are divided into a first group, and the second data-outputting terminals are divided into a second groups;

checking the status of at least one polarity signal;

connecting the first data-outputting terminals in the first groups with each other and connecting the second data-outputting terminals in the second group with each other when the polarity signal is in a first status at a sampling point; and connecting one of the first data-outputting terminals with a corresponding one of the second data-outputting terminals when the polarity signal is in a second status at the sampling point.

10. The operation method according to claim 9, further comprising receiving a display controlling signal.

11. The operation method according to claim 9, wherein when at least a part of an image displayed by the display apparatus operates in a line inversion mode, the polarity signal corresponding to the part of the image operating in the line inversion mode is in the first status.

12. The operation method according to claim 9, wherein when at least a part of an image displayed by the display apparatus operates in a dot inversion mode, the polarity signal corresponding to the part of the image operating in the dot inversion mode is in the second status.

13. The source-driving circuit according to claim 1, wherein the charge-sharing switch circuit determines that the polarity signal is in a first status, the charge-sharing switch circuit outputs the switch signal to enable the first switches, so that the first output terminals are connected with each other, and the second output terminals thereof are connected with each other.

14. The source-driving circuit according to claim 1, wherein the charge-sharing switch circuit determines that the polarity signal is in a second status, the charge-sharing switch circuit outputs the switch signal to enable the second switches, so that each of the first output terminals is connected with an adjacent one of the second output terminals.

15. The source-driving circuit according to claim 13, wherein the charge-sharing switch circuit determines that the polarity signal is in the first status when the display apparatus displays a single-color image or a compensation image.

16. The source-driving circuit according to claim 14, wherein the charge-sharing switch circuit determines that the polarity signal is in the second status when the display apparatus displays a color image.

* * * * *